(12) United States Patent
Tripathi

(10) Patent No.: US 12,244,411 B2
(45) Date of Patent: Mar. 4, 2025

(54) SYSTEMS AND METHODS FOR ENHANCED RATE ADAPTATION IN 5G

(71) Applicant: RAKUTEN MOBILE, INC., Tokyo (JP)

(72) Inventor: Sandeep Mani Tripathi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/796,028

(22) PCT Filed: Jun. 30, 2022

(86) PCT No.: PCT/US2022/035649
§ 371 (c)(1),
(2) Date: Jul. 28, 2022

(87) PCT Pub. No.: WO2024/005816
PCT Pub. Date: Jan. 4, 2024

(65) Prior Publication Data
US 2024/0187125 A1  Jun. 6, 2024

(51) Int. Cl.
*H04L 1/00* (2006.01)
*H04B 7/06* (2006.01)

(52) U.S. Cl.
CPC ......... *H04L 1/0009* (2013.01); *H04B 7/0632* (2013.01)

(58) Field of Classification Search
CPC ............................ H04L 1/0009; H04B 7/0632
See application file for complete search history.

(56) References Cited

U.S. PATENT DOCUMENTS

| 2013/0033989 A1 | 2/2013 | Barbieri et al. |
| 2013/0170469 A1* | 7/2013 | Yu .......................... H04L 5/0046 370/330 |

OTHER PUBLICATIONS

International Search Report dated Nov. 8, 2022, issued in International Application No. PCT/US2022/035649.
Written Opinion dated Nov. 8, 2022, issued in International Application No. PCT/US2022/035649.

* cited by examiner

*Primary Examiner* — Derrick V Rose
(74) *Attorney, Agent, or Firm* — Sughrue Mion, PLLC

(57) ABSTRACT

A method for enhanced rate adaptation by a radio access network (RAN) node includes: determining a first code rate, for sending one or more messages to a user equipment (UE) before a first time, based at least in part on a first rank and a first message error rate; sending the one or more messages to the UE before the first time using the first code rate; receiving channel quality information and a second rank from the UE at the first time, wherein the second rank is different than the first rank; determining a second code rate, for sending one or more messages to the UE after the first time and before a second time, based at least in part on the received channel quality information and second rank; and sending the one or more messages to the UE, after the first time and before a second time, using the second code rate.

20 Claims, 5 Drawing Sheets

SYSTEMS AND METHODS FOR ENHANCED RATE ADAPTATION IN 5G

CROSS REFERENCE TO RELATED APPLICATIONS

This application is a National Stage of International Application No. PCT/US2022/035649 filed Jun. 30, 2022.

FIELD

Apparatuses and methods consistent with example embodiments of the present disclosure relate to enhanced rate adaptation in a radio access network (RAN) (e.g., 5G, LTE). According to one aspect, a RAN node may adaptively vary a code rate used for communication between the RAN and a user equipment (UE).

DESCRIPTION OF RELATED ART

In related art telecommunications standards (e.g., 3GPP specifications for LTE, 5G, etc.), a UE may send a message to a RAN node that indicates a radio frequency (RF) condition of an environment between the UE and the RAN node. For example, the message sent by the UE may include a channel quality indicator (CQI) and a first rank indicator (RI). The RAN node may determine a first code rate to use for communicating with the UE based on the received CQI, first RI, and an error rate associated with previous messages. If the UE later sends a message to the RAN node specifying a new rank indicator (second RI), the RAN node determines a new code rate (second code rate) for the UE based on the same error rate that was used to determine the first code rate. However, a change in rank may often coincide with a change in channel quality. For example, when the rank increases, and data is sent over more layers, the CQI will initially decrease before improving. Using the same error rate may therefore cause the second code rate to be greater than a code rate actually supported by the UE in the environment. The disconnect between the second code rate and the supported code rate may lead to increased transmission loss and increased resource use to resend the lost or corrupt messages, and overall lower efficiency.

SUMMARY

According to embodiments, systems and methods are provided for performing enhanced rate adaptation by a radio access network (RAN) node.

According to aspects of one or more example embodiments, a method for enhanced rate adaptation by a radio access network (RAN) node includes: determining a first code rate, for sending one or more messages to a user equipment (UE) before a first time, based at least in part on a first rank and a first message error rate; sending the one or more messages to the UE before the first time using the first code rate; receiving channel quality information and a second rank from the UE at the first time, wherein the second rank is different than the first rank; determining a second code rate, for sending one or more messages to the UE after the first time and before a second time, based at least in part on the received channel quality information and second rank; and sending the one or more messages to the UE, after the first time and before a second time, using the second code rate.

The method may further include: determining a third code rate, for sending one or more messages to the UE after the second time, based at least in part on the second code rate, the second rank, and a second message error rate; and sending the one or more messages to the UE, after the second time, using the third code rate.

The second error rate may be based at least in part on a plurality of messages sent to one or more UE after the first time and at or before the second time.

The first message error rate may be based at least in part on a plurality of messages sent to one or more UE at or before the first time.

The first rank may correspond to a first number of layers used to send data in the one or more messages before the first time.

The second rank may correspond to a second number of layers used to send data in the one or more messages after the first time.

The method of receiving the channel quality information and the second rank from the UE at the first time, may include: determining a change in a radio frequency (RF) condition of an environment between the UE and the RAN, based at least in part on the second rank. The RF condition may be determined to be improved if the second rank is greater than the first rank, and the RF condition may be determined to be degraded if the second rank is less than the first rank.

According to aspects of one or more example embodiments, an apparatus for performing enhanced rate adaptation by a radio access network (RAN) node includes: a memory storing instructions; and at least one processor configured to execute the instructions to: determine a first code rate, for sending one or more messages to a user equipment (UE) before a first time, based at least in part on a first rank and a first message error rate; send the one or more messages to the UE before the first time using the first code rate; receive channel quality information and a second rank from the UE at the first time, wherein the second rank is different than the first rank; determine a second code rate, for sending one or more messages to the UE after the first time and before a second time, based at least in part on the received channel quality information and second rank; and send the one or more messages to the UE, after the first time and before a second time, using the second code rate.

The apparatus may further include instructions to: determine a third code rate, for sending one or more messages to the UE after the second time, based at least in part on the second code rate, the second rank, and a second message error rate; and send the one or more messages to the UE, after the second time, using the third code rate.

The second error rate may be based at least in part on a plurality of messages sent to one or more UE after the first time and at or before the second time.

The first message error rate may be based at least in part on a plurality of messages sent to one or more UE at or before the first time.

The first rank may correspond to a first number of layers used to send data in the one or more messages before the first time.

The second rank may correspond to a second number of layers used to send data in the one or more messages after the first time.

The instructions to receive the channel quality information and the second rank from the UE at the first time, may further include instructions to: determine a change in a radio frequency (RF) condition of an environment between the UE and the RAN, based at least in part on the second rank. The RF condition may be determined to be improved if the second rank is greater than the first rank, and the RF condition may be determined to be degraded if the second rank is less than the first rank.

According to aspects of one or more example embodiments, a non-transitory computer-readable medium for storing computer readable program code or instructions for carrying out operations, when executed by a processor, for enhanced rate adaptation (RA), includes operations for: determining a first code rate, for sending one or more messages to a user equipment (UE) before a first time, based at least in part on a first rank and a first message error rate; sending the one or more messages to the UE before the first time using the first code rate; receiving channel quality information and a second rank from the UE at the first time, wherein the second rank is different than the first rank; determining a second code rate, for sending one or more messages to the UE after the first time and before a second time, based at least in part on the received channel quality information and second rank; and sending the one or more messages to the UE, after the first time and before a second time, using the second code rate.

The non-transitory computer-readable medium may further include operations for: determining a third code rate, for sending one or more messages to the UE after the second time, based at least in part on the second code rate, the second rank, and a second message error rate; and sending the one or more messages to the UE, after the second time, using the third code rate.

The second error rate may be based at least in part on a plurality of messages sent to one or more UE after the first time and at or before the second time.

The first message error rate may be based at least in part on a plurality of messages sent to one or more UE at or before the first time.

The first rank may correspond to a first number of layers used to send data in the one or more messages before the first time, and the second rank may correspond to a second number of layers used to send data in the one or more messages after the first time.

The operation for receiving the channel quality information and the second rank from the UE at the first time, may further include operations for: determining a change in a radio frequency (RF) condition of an environment between the UE and the RAN, based at least in part on the second rank. The RF condition may be determined to be improved if the second rank is greater than the first rank, and the RF condition may be determined to be degraded if the second rank is less than the first rank.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
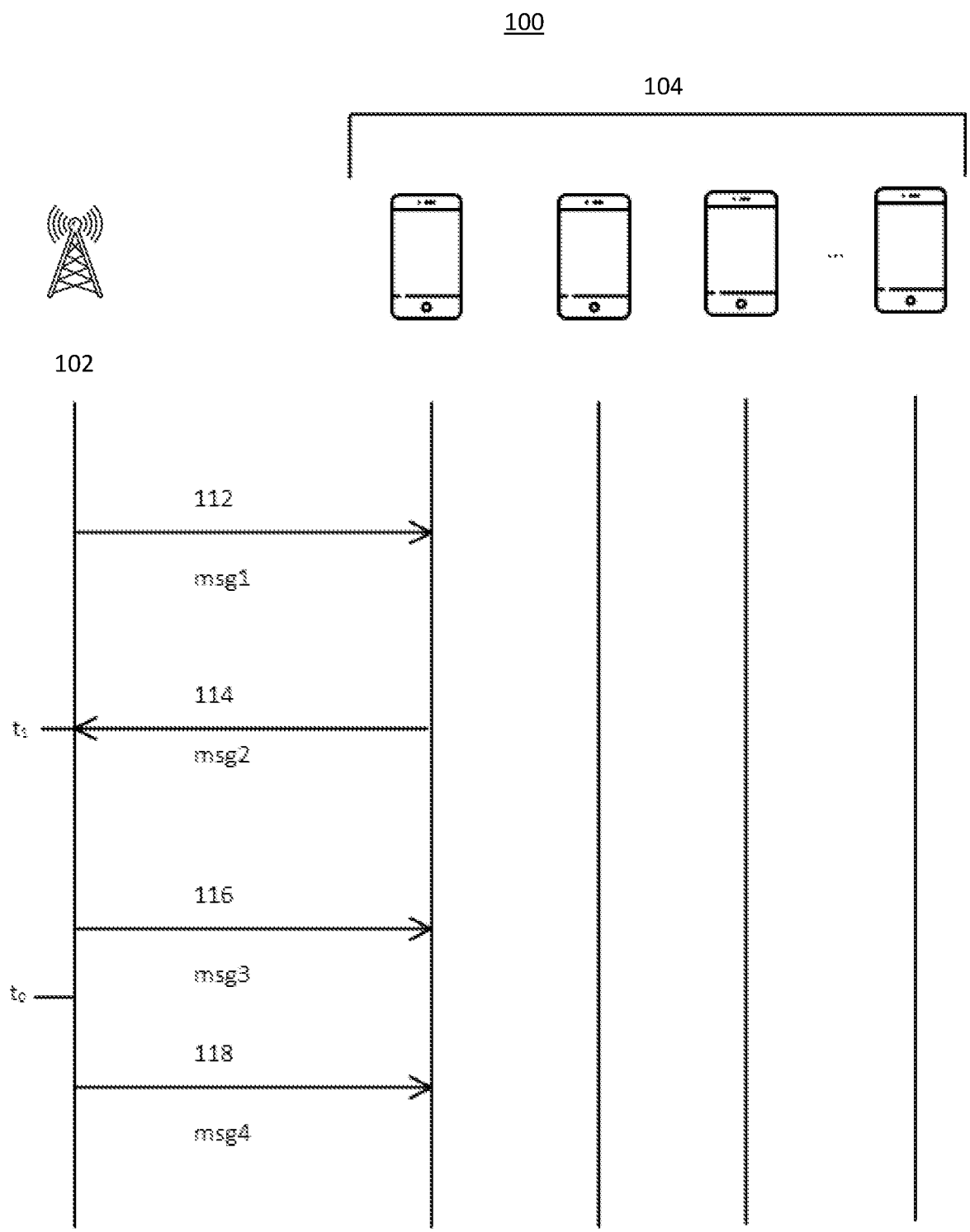
FIG. 1 illustrates enhanced rate adaptation performed by a radio access network (RAN) node, in accordance with one or more example embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, the related art determines a new code rate in response to a new rank indicator (RI) from a user equipment (UE) based on an old error rate, and the new code rate may not accurately reflect a code rate actually supported by the UE. The disconnect between the new code rate and the code rate actually supported by the UE may lead to increased transmission loss and increased resource use to resend the lost or corrupt messages, and overall lower efficiency.

Example embodiments provide a system and method that perform enhanced rate adaptation in response to a change in rank. For instance, a radio access network (RAN) node may determine a first new code rate and a second new code rate for communication with the UE when the UE reports a new rank (e.g., second rank). The first new code rate may be based on the second rank and a channel quality indicator (CQI) reported with the second rank by the UE. The first new code rate may be associated with a first time, and the RAN node may use the first new code rate for communicating with the UE when sending one or more messages to the UE after the first time. The second new code rate may be based on the second rank and a block error rate (BLER) that indicates an error rate from the first time to a second time. The second new code rate may be associated with the second time, and the RAN node may use the second new code rate for communicating with the UE when sending one or more messages to the UE after the second time.

FIG. 1 illustrates enhanced rate adaptation performed by a radio access network (RAN) node, in accordance with one or more example embodiments. Referring to FIG. 1, before a first time t1, the RAN node 102 may send one or more message(s) 112 (e.g., msg1) to a UE 104. The node 102 may generate the message(s) 112 using a first code rate. For example, the message(s) 112 may include a modulation coding scheme (MCS), number of layers, and number of physical resource blocks (PRBs) that correspond to the first code rate. The node 102 may determine the first code rate based at least in part on a first rank and a first block error rate (BLER). The node 102 may determine the first rank based on a rank indicator previously reported by the UE 104. Alternatively, the node 102 may determine the first rank based on a predetermined initial rank. The node 102 may determine the first BLER based at least in part on a plurality of messages sent to one or more UE before the first time t1. For example, the node 102 may keep track of an of acknowledgement (ACK) or a negative acknowledgements (NACK) reported by each UE in response to a message. The node 102 may determine the first BLER based on a ratio of a number of ACKs received and a number of NACKs received in response to the plurality of messages sent before the first time t1.

At the first time t1, the node 102 may receive a message 114 (e.g., msg2) from the UE 104. The UE 104 may generate the message 114 based at least in part on the first code rate. For example, the message 114 may include the modulation coding scheme (MSC), number of layers, and number of physical resource blocks (PRBs) that correspond to the first code rate. The message 114 may include a CQI and a rank indicator specifying a second rank that is different to the first rank. The UE 104 may determine a second rank based on a RF condition of an environment (e.g., CQI) determined by the UE 104, and the UE 104 may report the second rank as a suggested rank to use based at least in part on the RF condition of the environment. The UE 104 may report a second rank greater than the first rank, for example, if the UE 104 determines an improved RF condition of an environment between the UE 104 and the node 102. The UE 104 may report a second rank less than the first rank, for example, if the UE 104 determines a degraded RF condition of the environment between the UE 104 and the node 102. In response to receiving the message 114 including the second rank, the node 102 may perform enhanced rate adaptation for the UE. For example, the node 102 may determine a second code rate based on the CQI and second rank.

After the first time t1, and before a second time t2, the node 102 may send one or more message(s) 116 (e.g., msg3) to the UE 104. The node 102 may generate the message(s) 116 using the second code rate. For example, the message(s) 116 may include a MCS, number of layers, and number PRBs that correspond to the second code rate.

Before the second time t2, the node 102 may determine a third code rate. The node 102 may determine the third code rate based at least in part on the second rank and a second BLER. The node 102 may determine the second BLER based at least in part on a plurality of messages sent to one or more UE after the first time t1 and before the second time t2. For example, the node 102 may keep track of an ACK or NACK reported by each UE in response to a message sent by the node 102 after the first time t1 and before the second time t2. The node 102 may determine the second BLER based on a ratio of a number of ACKs received and a number of NACKs received in response to the plurality of messages sent between the first time t1 and the second time t2.

After the second time t2, the node 102 may send one or more message(s) 118 (e.g., msg4) to the UE 104. The node 102 may generate the message(s) 118 using the third code rate. For example, the message(s) 118 may include a MCS, number of layers, and number of PRBs that correspond to the third code rate.

Figure 2:
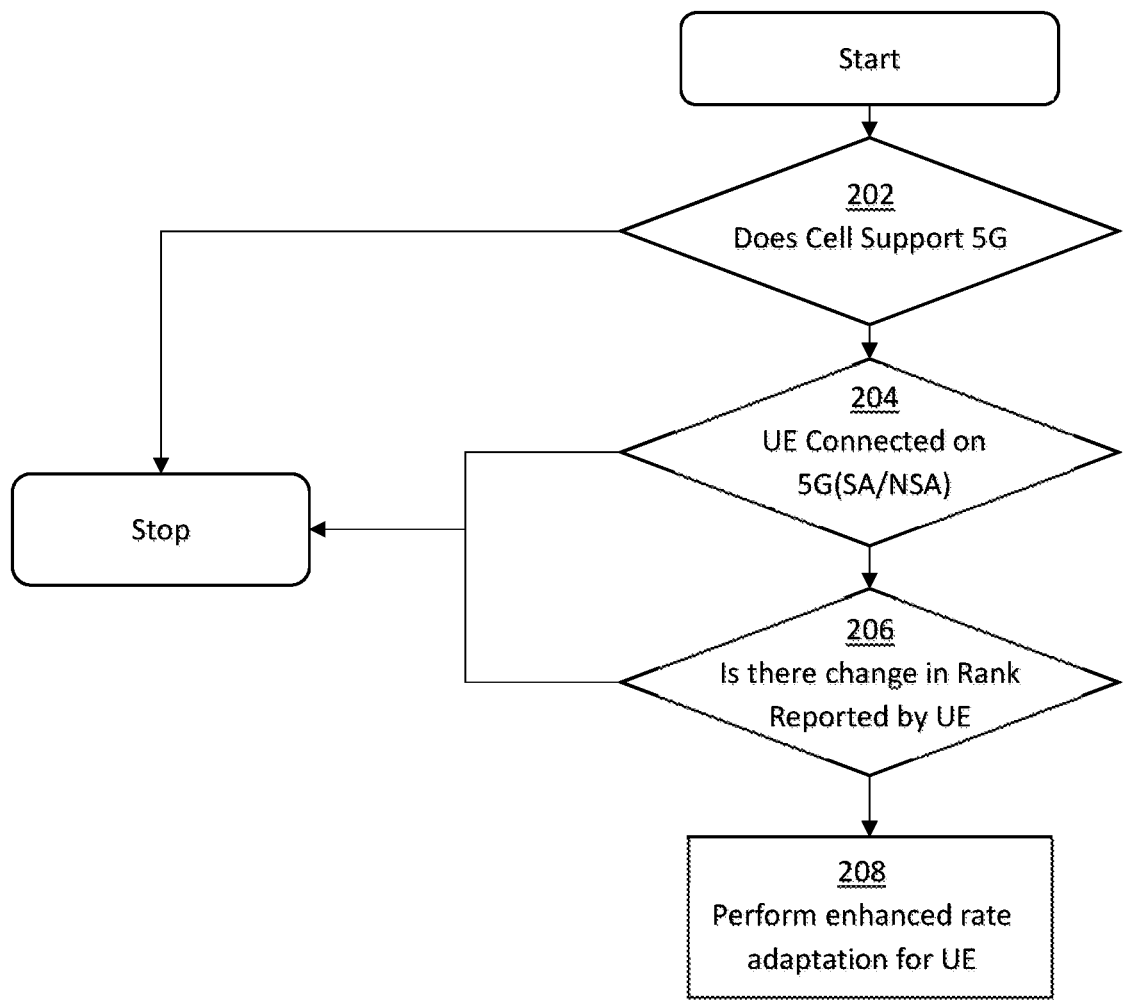
FIG. 2 illustrates a flowchart of a method for enhanced rate adaptation by a RAN node, in accordance with one or more example embodiments.

FIG. 2 illustrates a flowchart of a method for enhanced rate adaptation by a RAN node. Referring to FIG. 2, at operation 202, the node 102 may determine if it services a cell supporting 5G. If the node 102 determines that the cell does not support 5G, then the node 102 proceeds to stop. If the node 102 determines that the cell supports 5G, then the node 102 proceeds to operation 204.

At operation 204, the node 102 may determine if it is servicing a UE that supports 5G. If the node 102 determines that it is not servicing a UE that supports 5G, then the node 102 proceeds to stop. If the node 102 determines that it is servicing a UE that supports 5G, then the node 102 proceeds to operation 206.

At operation 206, the node 102 may determine if a UE has reported a change in rank. For example, the node 102 may inspect a message from the UE to determine if the message includes a new rank indicator. If the UE has not reported a change in rank, the node 102 proceeds to stop. If the UE has reported a change in rank, the node 102 proceeds to operation 208.

At operation 208, the node 102 may perform enhanced rate adaptation for the UE. For example, the node 102 may determine a first new code rate and a second new code rate corresponding to a first time and a second time, respectively. The node 102 may use the first new code rate for communicating with the UE after the first time and before the second time, and the node 102 may use the second new code rate for communicating with the UE after the second time.

Figure 3:
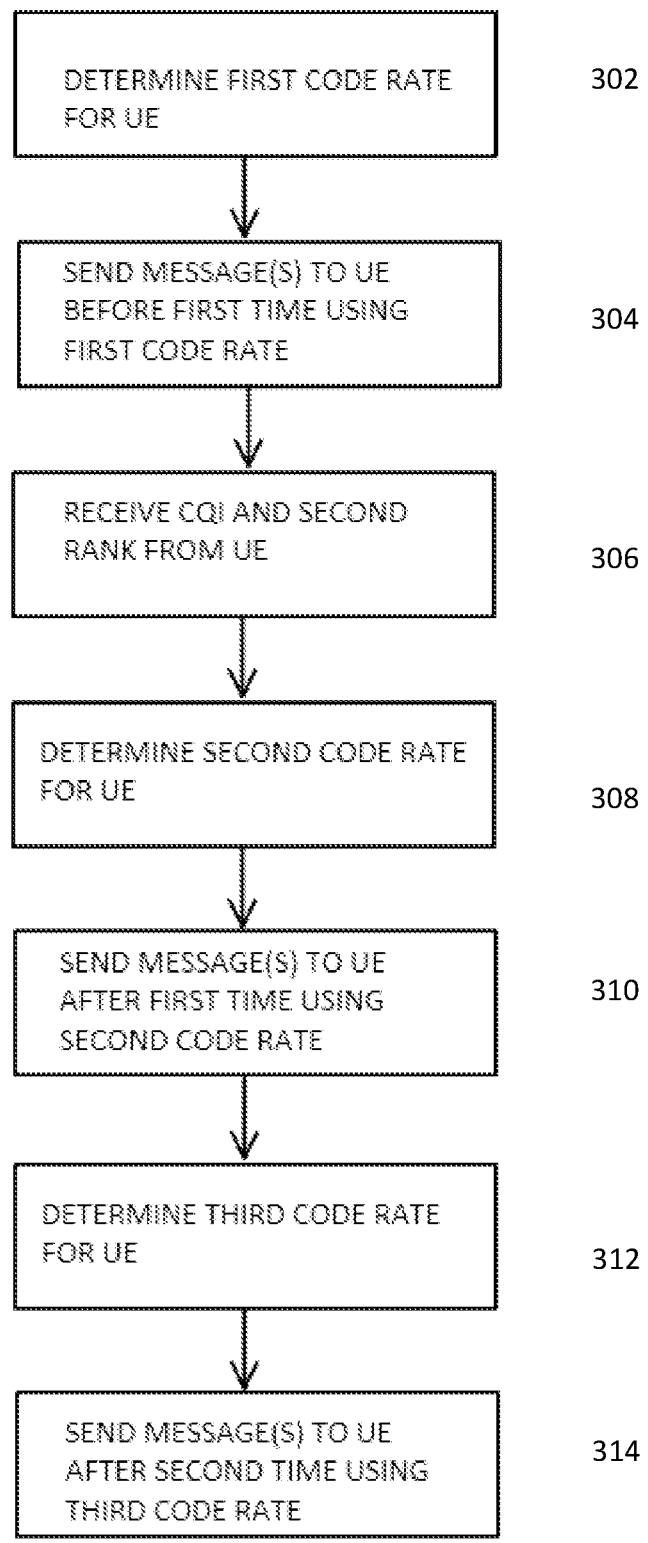
FIG. 3 illustrates a flowchart of a method for enhanced rate adaptation by a RAN node, in accordance with one or more example embodiments.

FIG. 3 illustrates a flowchart of a method for enhanced rate adaptation by a RAN node. Referring to FIG. 3, at operation 302, the RAN node may determine a first code rate. The RAN node may use the first code rate for communicating with a UE. For example, the node 102 may determine the first code rate for communicating with UE 104 based at least in part on a first rank associated with UE 104, and a first block error rate (BLER). The node 102 may determine the first rank based on a rank indicator previously reported by the UE 104. In some implementations, the node 102 may determine the first rank based on a predetermined initial rank. The node 102 may determine the first BLER based at least in part on a plurality of messages sent to one or more UE before a first time t1. For example, the node 102 may keep track of an of acknowledgement (ACK) or a negative acknowledgements (NACK) reported by each UE in response to a message. The node 102 may determine the first BLER based on a ratio of a number of ACKs received and a number of NACKs received in response to the plurality of messages sent before the first time t1.

At operation 304, the RAN node may send message(s) to the UE at or before a first time using the first code rate. For example, the node 102 may generate the message(s) 112 using the first code rate, and send the message(s) 112 to the UE 104 at or before the first time t1. The message(s) 112 may include a MCS, number of layers, and number of PRBs that correspond to the first code rate.

At operation 306, the RAN node may receive CQI and a second rank from the UE. The CQI and second rank may be reported to the RAN node by the UE. For example, at the first time t1, the node 102 may receive the message 114 from the UE 104. The message 114 may include a CQI and a rank indicator specifying a second rank that is different to the first rank.

At operation 308, the RAN node may determine a second code rate. For example, the node 102 may determine a second code rate based on the CQI and second rank reported by the UE 104 in the message 114.

At operation 310, the RAN node may send message(s) to the UE after the first time and at or before a second time using the second code rate. For example, the node 102 may generate the message(s) 116 using the second code rate, and send the message(s) 116 to the UE 104 after the first time t1 and at or before a second time t2. The message(s) 116 may include a MCS, number of layers, and number of PRBs that correspond to the second code rate.

At operation 312, the RAN node may determine a third code rate. For example, the node 102 may determine a third code rate based on the CQI and second rank reported by the UE 104 in the message 114 and a second BLER. The node 102 may determine the second BLER based at least in part on a plurality of messages sent to one or more UE after the first time t1 and before the second time t2. For example, the node 102 may keep track of an ACK or NACK reported by each UE in response to a message sent by the node 102 after the first time t1 and before the second time t2. The node 102 may determine the second BLER based on a ratio of a number of ACKs received and a number of NACKs received in response to the plurality of messages sent between the first time t1 and the second time t2.

At operation 314, the RAN node may send message(s) to the UE after the second time using the third code rate. For example, the node 102 may generate the message(s) 118 using the third code rate, and send the message(s) 118 to the UE 104 after the second time t2. The message(s) 118 may include a MCS, number of layers, and number of PRBs that correspond to the third code rate.

Figure 4:
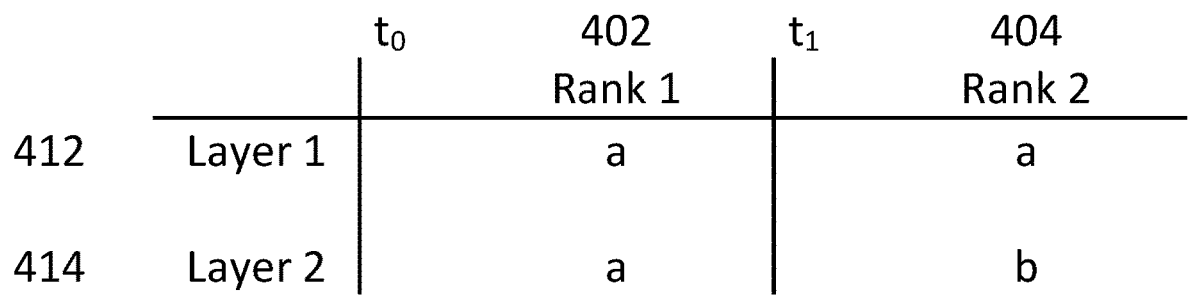
FIG. 4 illustrates a relationship between a rank and a number of layers, in accordance with one or more example embodiments.

FIG. 4 illustrates a relationship between a rank and a number of layers, in accordance with one or more example embodiments. Referring to FIG. 4, prior to a time t1, a RAN node and UE may communicate using a first code rate based on a first rank 402 (e.g., Rank 1). When using the first code rate based on the first rank 402, a first layer 412 of a message and a second layer 414 of the message may both include the same data. After the UE reports a second rank 404 at time t1, the RAN node and UE may communicate using a second code rate based on the second rank 404. When using the second code rate based on the second rank 404, the first layer 412 and the second layer 414 of the message may include distinct data and data, respectively.

Figure 5:
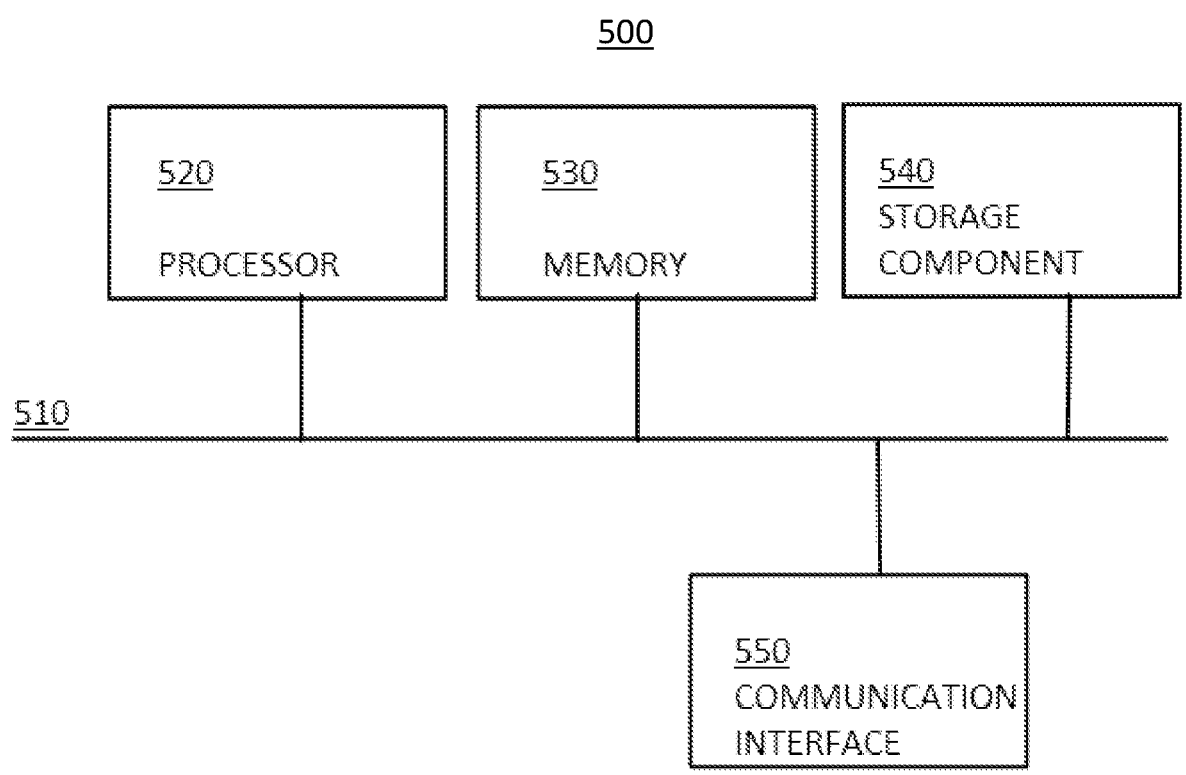
FIG. 5 illustrates a diagram of components of one or more devices, in accordance with one or more example embodiments.

FIG. 5 illustrates a diagram of components of one or more devices, in accordance with one or more example embodiments. Device 500 may correspond to any of the devices described above (e.g., UE, base station, RAN node, core network device implementing core network function).

Referring to FIG. 5, the device 500 may include a bus 510, a processor 520, a memory 530, a storage component 540, and a communication interface 550. It is understood that one or more of the components may be omitted and/or one or more additional components may be included.

The bus 510 includes a component that permits communication among the components of the device 500. The processor 520 is implemented in hardware, firmware, or a combination of hardware and software. The processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 520 includes one or more processors capable of being programmed to perform a function.

The memory 530 includes a random access memory (RAM), a read only memory (ROM), and/or another type of dynamic or static storage device (e.g., a flash memory, a magnetic memory, and/or an optical memory) that stores information and/or instructions for use by the processor 520.

The storage component 540 stores information and/or software related to the operation and use of the device 500. For example, the storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 550 includes a transceiver-like component (e.g., a transceiver and/or a separate receiver and transmitter) that enables the device 900 to communicate with other devices, such as via a wired connection, a wireless connection, or a combination of wired and wireless connections. The communication interface 550 may permit device 500 to receive information from another device and/or provide information to another device. For example, the communication interface 550 may include an Ethernet interface, an optical interface, a coaxial interface, an infrared interface, a radio frequency (RF) interface, a universal serial bus (USB) interface, a Wi-Fi interface, a cellular network interface, or the like.

The device 500 may perform one or more processes or functions described herein. The device 500 may perform operations based on the processor 520 executing software instructions stored by a non-transitory computer-readable medium, such as the memory 530 and/or the storage component 540. A computer-readable medium is defined herein as a non-transitory memory device. A memory device includes memory space within a single physical storage device or memory space spread across multiple physical storage devices.

Software instructions may be read into the memory 530 and/or the storage component 540 from another computer-readable medium or from another device via the communication interface 550. When executed, software instructions stored in the memory 530 and/or storage component 540 may cause the processor 520 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 2-4 may be implemented by or using any one of the elements illustrated in FIGS. 1 and 5.

According to example embodiments, a RAN node may perform enhanced rate adaptation for a UE in response to a change in rank reported by the UE. For instance, the RAN node may determine a first code rate for communication with the UE based on a first rank associated with the UE and a first BLER. In response to the UE reporting a new rank (second rank), the RAN node may determine a second code rate and a third code rate for communication with the UE. The second code rate may be based on the second rank and a channel quality indicator (CQI) reported by the UE. The second code rate may be associated with a first time, and the RAN node may use the second code rate for communicating with the UE after the first time. The third code rate may be based on the second rank and a second BLER that indicates an error rate from the first time to a second time. The third code rate may be associated with the second time, and the RAN node may use the third code rate for communicating with the UE when sending one or more messages to the UE after the second time. By ignoring the a first BLER when determining the second code rate, and by determining a second BLER before determining the third code rate, the RAN node may effectively reset the rate adaptation performed for the UE after the change in rank, and ensure that the code rate used for communication more accurately reflects a capability of the UE.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for enhanced rate adaptation by a radio access network (RAN) node, the method comprising:
   determining a first code rate, for sending one or more messages to a user equipment (UE) before a first time, based at least in part on a first rank and a first message error rate;
   sending the one or more messages to the UE before the first time using the first code rate;
   receiving channel quality information and a second rank from the UE at the first time, wherein the second rank is different than the first rank;
   determining a second code rate, for sending one or more messages to the UE after the first time and before a second time, based at least in part on the received channel quality information and second rank; and
   sending the one or more messages to the UE, after the first time and before a second time, using the second code rate.

2. The method of claim 1, further comprising:
   determining a third code rate, for sending one or more messages to the UE after the second time, based at least in part on the second code rate, the second rank, and a second message error rate; and
   sending the one or more messages to the UE, after the second time, using the third code rate.

3. The method of claim 2, wherein the second error rate is based at least in part on a plurality of messages sent to one or more UE after the first time and at or before the second time.

4. The method of claim 1, wherein the first message error rate is based at least in part on a plurality of messages sent to one or more UE at or before the first time.

5. The method of claim 1, wherein the first rank corresponds to a first number of layers used to send data in the one or more messages before the first time.

6. The method of claim 1, wherein the second rank corresponds to a second number of layers used to send data in the one or more messages after the first time.

7. The method of claim 1, wherein receiving the channel quality information and the second rank from the UE at the first time, comprises:
   determining a change in a radio frequency (RF) condition of an environment between the UE and the RAN, based at least in part on the second rank,
   wherein the RF condition is determined to be improved if the second rank is greater than the first rank, and the RF condition is determined to be degraded if the second rank is less than the first rank.

8. An apparatus for performing enhanced rate adaptation by a radio access network (RAN) node, the apparatus comprising:
   a memory storing instructions; and
   at least one processor configured to execute the instructions to:
      determine a first code rate, for sending one or more messages to a user equipment (UE) before a first time, based at least in part on a first rank and a first message error rate;
      send the one or more messages to the UE before the first time using the first code rate;
      receive channel quality information and a second rank from the UE at the first time, wherein the second rank is different than the first rank;
      determine a second code rate, for sending one or more messages to the UE after the first time and before a second time, based at least in part on the received channel quality information and second rank; and
      send the one or more messages to the UE, after the first time and before a second time, using the second code rate.

9. The apparatus of claim 8, further comprising instructions to:
   determine a third code rate, for sending one or more messages to the UE after the second time, based at least in part on the second code rate, the second rank, and a second message error rate; and
   send the one or more messages to the UE, after the second time, using the third code rate.

10. The apparatus of claim 9, wherein the second error rate is based at least in part on a plurality of messages sent to one or more UE after the first time and at or before the second time.

11. The apparatus of claim 8, wherein the first message error rate is based at least in part on a plurality of messages sent to one or more UE at or before the first time.

12. The apparatus of claim 8, wherein the first rank corresponds to a first number of layers used to send data in the one or more messages before the first time.

13. The apparatus of claim 8, wherein the second rank corresponds to a second number of layers used to send data in the one or more messages after the first time.

14. The apparatus of claim 8, wherein the instructions to receive the channel quality information and the second rank from the UE at the first time, comprise instructions to:
 determine a change in a radio frequency (RF) condition of an environment between the UE and the RAN, based at least in part on the second rank,
 wherein the RF condition is determined to be improved if the second rank is greater than the first rank, and the RF condition is determined to be degraded if the second rank is less than the first rank.

15. A non-transitory computer-readable medium for storing computer readable program code or instructions for carrying out operations, when executed by a processor, for enhanced rate adaptation (RA), the operations comprising:
 determining a first code rate, for sending one or more messages to a user equipment (UE) before a first time, based at least in part on a first rank and a first message error rate;
 sending the one or more messages to the UE before the first time using the first code rate;
 receiving channel quality information and a second rank from the UE at the first time, wherein the second rank is different than the first rank;
 determining a second code rate, for sending one or more messages to the UE after the first time and before a second time, based at least in part on the received channel quality information and second rank; and
 sending the one or more messages to the UE, after the first time and before a second time, using the second code rate.

16. The non-transitory computer-readable medium of claim 15, further comprising:
 determining a third code rate, for sending one or more messages to the UE after the second time, based at least in part on the second code rate, the second rank, and a second message error rate; and
 sending the one or more messages to the UE, after the second time, using the third code rate.

17. The non-transitory computer-readable medium of claim 16, wherein the second error rate is based at least in part on a plurality of messages sent to one or more UE after the first time and at or before the second time.

18. The non-transitory computer-readable medium of claim 1, wherein the first message error rate is based at least in part on a plurality of messages sent to one or more UE at or before the first time.

19. The non-transitory computer-readable medium of claim 1, wherein the first rank corresponds to a first number of layers used to send data in the one or more messages before the first time, and the second rank corresponds to a second number of layers used to send data in the one or more messages after the first time.

20. The non-transitory computer-readable medium of claim 1, wherein receiving the channel quality information and the second rank from the UE at the first time, comprises:
 determining a change in a radio frequency (RF) condition of an environment between the UE and the RAN, based at least in part on the second rank,
 wherein the RF condition is determined to be improved if the second rank is greater than the first rank, and the RF condition is determined to be degraded if the second rank is less than the first rank.

* * * * *